(12) United States Patent
Brinsfield et al.

(10) Patent No.: US 6,870,484 B1
(45) Date of Patent: Mar. 22, 2005

(54) PATIENT MONITORING SYSTEMS HAVING TWO-WAY COMMUNICATION

(75) Inventors: James Brinsfield, Mequon, WI (US); Michael F. Steinike, Grafton, WI (US)

(73) Assignee: GE Marquette Medical Systems, Inc., Milwaukee, WI (US)

( * ) Notice: Subject to any disclaimer, the term of this patent is extended or adjusted under 35 U.S.C. 154(b) by 0 days.

(21) Appl. No.: 09/275,205

(22) Filed: Mar. 24, 1999

(51) Int. Cl.[7] .................................................. G08C 17/00
(52) U.S. Cl. ........................ 340/825.49; 340/286.07; 340/539.12; 340/870.07; 600/300
(58) Field of Search ...................... 340/286.07, 825.49, 340/2.1, 3.1, 5.1, 7.1, 10.1, 286.7, 870.11, 539, 870.07, 539.12; 128/903, 904; 379/106.07; 600/300

(56) References Cited

U.S. PATENT DOCUMENTS

| | | | |
|---|---|---|---|
| 3,639,907 A | 2/1972 | Greatbatch | |
| 4,658,831 A | 4/1987 | Reinhard et al. | 128/697 |
| 4,675,656 A | 6/1987 | Narcisse | 340/539 |
| 4,827,943 A | 5/1989 | Bornn et al. | 128/668 |
| 4,837,568 A | 6/1989 | Snaper | 340/825.54 |
| 4,958,645 A | 9/1990 | Cadell et al. | 128/903 |
| 5,153,584 A | 10/1992 | Engira | 340/870.18 |
| 5,205,294 A | 4/1993 | Flach et al. | 128/696 |
| 5,238,001 A | 8/1993 | Gallant et al. | 128/700 |
| 5,319,363 A | 6/1994 | Welch et al. | 340/825.36 |
| 5,390,238 A | 2/1995 | Kirk et al. | 379/93 |
| 5,396,224 A | 3/1995 | Dukes et al. | 340/825.49 |
| 5,417,222 A | 5/1995 | Dempsey et al. | 128/696 |
| 5,458,123 A | 10/1995 | Unger | 128/696 |
| 5,579,001 A | 11/1996 | Dempsey et al. | 340/870.01 |
| 5,579,775 A | 12/1996 | Dempsey et al. | 128/670 |
| 5,621,384 A | 4/1997 | Crimmins et al. | 340/539 |
| 5,687,734 A | 11/1997 | Dempsey et al. | 128/696 |
| 5,689,229 A | 11/1997 | Chaco et al. | 340/286.07 |
| 5,694,940 A | 12/1997 | Unger et al. | 128/696 |
| 5,748,103 A * | 5/1998 | Flach et al. | 340/870.07 |
| 5,767,791 A * | 6/1998 | Stoop et al. | 340/870.11 |
| 5,855,550 A | 1/1999 | Lai et al. | 600/300 |
| 5,877,675 A * | 3/1999 | Rebstock et al. | 340/286.07 |
| 5,944,659 A * | 8/1999 | Flach et al. | 600/300 |
| 5,959,529 A * | 9/1999 | Kail, IV | 340/539 |

FOREIGN PATENT DOCUMENTS

EP    0 602 459 A2    6/1994

* cited by examiner

Primary Examiner—Edwin C. Holloway, III
(74) Attorney, Agent, or Firm—Andrus, Sceales, Starke & Sawall, LLP

(57) ABSTRACT

A patient monitoring system comprising a central station for analyzing and displaying patient data; a system receiver connected to the central station; and an antenna array connected to the system receiver and including a plurality of antennae, each having connected thereto a respective transmitter.

25 Claims, 2 Drawing Sheets

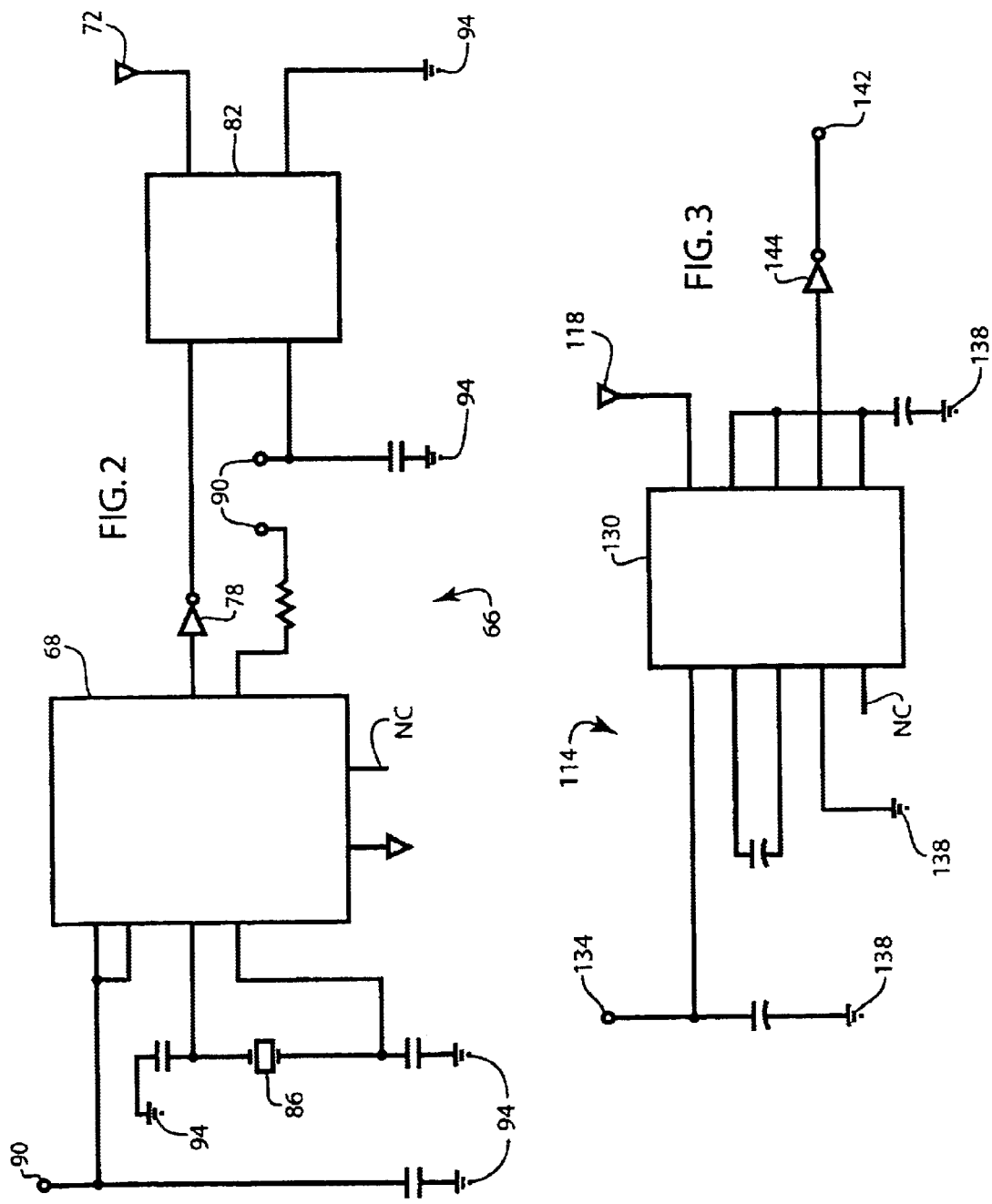

PATIENT MONITORING SYSTEMS HAVING TWO-WAY COMMUNICATION

BACKGROUND OF THE INVENTION

The invention relates to patient monitoring systems and particularly to patient monitoring systems that allow the patient to ambulate through the care unit of a clinical facility.

Most patient monitoring systems that allow a patient to ambulate through a care unit in a clinical facility use telemetry-based communication schemes. In its most common form, a patient wears a telemetry transmitter attached to the patient using common ECG electrodes. The telemetry transmitter acquires an ECG signal, conducts a nominal amount of filtering on the ECG signal, and transmits the ECG signal to an antenna array, typically located in the ceiling of the care unit. The ECG signal is conducted through the antenna array to a telemetry receiver, which in turn, is connected to a central station that analyzes and displays the ECG information for viewing and evaluation by the clinicians staffing the care units.

However, it is frequently desirable to be able to quickly locate the patient in a care unit if circumstances indicate that there is a problem with the patient. In other cases, it is desirable to be able to send data back from the central station to the telemetry transmitter.

SUMMARY OF THE INVENTION

Accordingly, the invention provides a telemetry-based patient monitoring system that allows the clinician to determine the location of the telemetry transmitter, and that allows the clinician to send data from the central station to the telemetry transmitter. More specifically, the invention includes a portable telemetry transmitter. The telemetry transmitter is connected to the patient to receive physiological signals from the patient and transmit those signals to the antenna array. The telemetry transmitter includes an RF receiver.

The invention also provides a patient monitoring system including a central station for analyzing and displaying the physiological signals. The patient monitoring system further includes a receiver subsystem connected to the central station and an antenna array connected to the receiver subsystem. The antenna array includes a plurality of antennae each connected to an RF amplifier and supporting circuitry. Each antenna also has connected thereto a respective transmitter. In one form of the invention, each antenna includes a printed circuit board and the transmitter is mounted on the printed circuit board with the antenna circuitry, i.e., the RF amplifier and supporting circuitry. In another form of the invention, the transmitter is a discrete component that can be connected to the antenna after the system has already been installed in the care facility in order to "retro-fit" the patient monitoring system.

Each antenna is given a discrete address, the location of which is programmed into the central station. The antenna uses the antenna transmitter to transmit the address as a low power beacon. When the beacon is received by the telemetry transmitter, the telemetry transmitter combines the physiological data with the address and transmits the combined data signal to the receiver subsystem via the antenna array. From the receiver subsystem, the data is sent to the central station to be processed and displayed as required by the clinicians.

The receiver subsystem also allows communication from the central station to the transmitter associated with each antenna. Most commonly, the data will be in the form of voice communications, and will be transmitted to the telemetry transmitter and output from the transmitter on a speaker so that the communication is audible to the patient or to the clinician caring for the patient.

In still another form of the invention, each telemetry transmitter includes a microphone for receiving voice data and transmitting the voice data back to the central station.

A principal advantage of the invention is to provide a telemetry-based patient monitoring system that allows for complete two-way communication of both voice and physiological data, and that allows the clinician to accurately detect the location of the telemetry transmitter.

It is another advantage of the invention to provide a way of retro-fitting existing telemetry-based patient monitoring systems with a transmitter at each antenna in the antenna array to thereby allow for complete two-way communication of voice and physiological data, and allow the clinician to accurately determine the location of the telemetry transmitter.

Other features and advantages of the invention are set forth in the following detailed description, claims and drawings.

BRIEF DESCRIPTION OF THE DRAWINGS

FIG. 2 is a schematic of the antenna transmitter subsystem.

FIG. 3 is a schematic illustration of the portable telemetry unit receiver subsystem.

Figure 1:
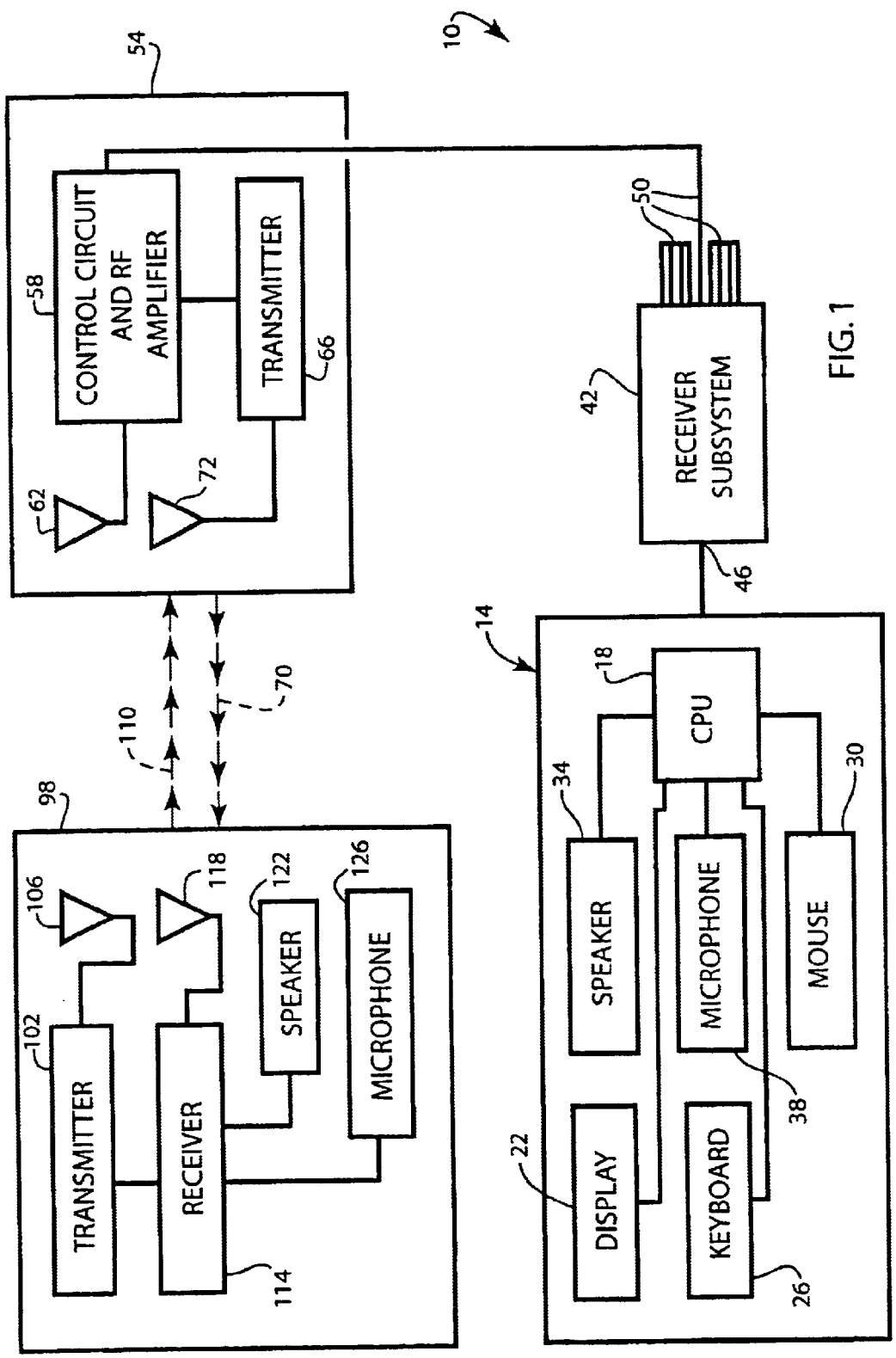
FIG. 1 is a block diagram of the patient monitoring system embodying the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Shown in FIG. 1 of the drawings is a block diagram of a telemetry-based patient monitoring system 10 embodying the invention. As is commonly known in the art, the patient monitoring system 10 includes a central station 14. The central station 14 typically has a CPU or central processing unit 18, which, in its most common form is a computer. The central station 14 also includes a display or display units 22 connected to the CPU 18. The display 22 typically shows patient waveforms and other patient data.

The central station 14 also includes various means for the clinician to interact with the CPU 18. As shown in the drawing, these means include a keyboard 26 for entering information relating to the patient, a mouse 30 for controlling CPU operations, a speaker 34 for generating audible alarms, data or other audible information, and a microphone 38 for receiving audio information and transmitting that information in electronic form to the CPU 18.

The central station 14 is connected to a receiver subsystem 42. The receiver subsystem 42 includes a single input/output (I/O) port 46 connected to the central station 14, and a series of I/O ports 50 connected to a plurality of antennae 54 spaced about the care unit to form an antenna array connected to the receiver subsystem 42. While the number of antennae 54 may vary in any particular situation, the antennae 54 are all identical and accordingly only the single antenna 54 shown in FIG. 1 will be described.

The antenna 54 includes a control circuit 58 coupled with a radio frequency (RF) amplifier. A common RF antenna 62 is connected to the control circuit and RF amplifier 58 so that incoming radio frequency signals are picked up by the RF antenna 62, and are transmitted to the control circuit and RF amplifier 58 where they are filtered, amplified and sent to the receiver subsystem 42.

The antenna 54 also includes an antenna transmitter circuit 66 connected to the control circuit and RF amplifier 58. The antenna transmitter circuit 66 generates a low power RF carrier signal 70 (represented as a phantom line in FIG. 1). FIG. 2 illustrates a schematic diagram of the antenna transmitter circuit 66. As shown in FIG. 2, the antenna transmitter circuit includes an EPROM-based 8-bit CMOS microcontroller 68 (Microchip Technology, Inc. Part No. PIC16C62X) connected to an RF antenna 72 through an inverting buffer 78 and a transmitter 82. While any appropriate transmitter can be used, the transmitter 82 prototyped for the preferred embodiment is a 303.825 megahertz hybrid transmitter (Model No. HX1006 produced by RF Monolithics, Inc.) As shown in FIG. 2, the antenna transmitter circuit 66 also includes an oscillator 86, and various support circuitry, as well as power connections 90 and common connections 94 as those of skill in the art understand are required for operating the antenna transmitter circuit 66.

Referring again to FIG. 1, the telemetry-based patient monitoring system 10 also includes a portable telemetry monitor 98. In use, the portable telemetry monitor 98 is connected to the patient (not shown) via ECG leads (also not shown) or through a patient connection suitable for measuring other patient parameters. Once connected to the patient, the patient is free to ambulate throughout the care unit as desired or able. As is commonly known in the art, the portable telemetry monitor 98 includes a transmitter sub-circuit 102 connected to a transmitting antenna 106. The transmitter sub-circuit 102 generates a RF carrier signal 110 (represented as a phantom line in FIG. 1) for transmitting patient and other data to the antenna array.

The portable telemetry monitor 98 also includes a receiver sub-circuit 114 connected to a receiving antenna 118, a speaker 122, and a microphone 126. FIG. 3 illustrates in greater detail a schematic illustration of the receiver sub-circuit 114. As shown in FIG. 3, the receiver sub-circuit 114 includes an RF receiver 130 connected to antenna 118. While any appropriate RF receiver can be used, the RF receiver 130 prototyped in the preferred embodiment is a 303.825 megahertz amplifier-sequenced hybrid receiver (Model No. RX1120, manufactured by RF Monolithics, Inc.). The receiver sub-circuit 114 also includes support circuitry, power inputs 134 and common connections 138 as those of skill in the art understand are required for operating the receiver sub-circuit 114. The receiver sub-circuit 114 also includes an microprocessor input 142 connected to the microprocessor (not shown) of the portable telemetry unit. The microprocessor is responsible for receiving all physiological data and other incoming signals and routing them to the transmitter sub-circuit 102. Inverting buffer 144 is connected between microprocessor input 142 and RF receiver 130.

In operation, the antenna transmitter circuit 66 generally functions in a default or beacon mode. In this mode, the antenna transmitter circuit 66 generates an 8-bit address and transmits (via the low power RF carrier 70) the 8-bit address. In the lower power beacon mode, the carrier 70 is capable of being received by the portable telemetry monitor 98 at a range of approximately ten to twenty feet from the RF antenna 62. While the range of the low power beacon mode may vary, it is important that the range be sufficiently limited so as not to overlap with the low power beacon mode transmission of another antenna transmitter. The location of the RF antenna 62 is programmed into the central station 14 at the time of installation using the 8-bit address. In the preferred embodiment, the 8-bit address is re-transmitted every 500 milliseconds and represents approximately five percent of the total available broadcast time of the antenna transmitter. The remaining 95 percent of the antenna transmitter broadcast time is kept available to be used for data communication.

The receiver sub-circuit 114 in the portable telemetry monitor 98 picks up the 8-bit sequence and combines the 8-bit sequence with the physiological patient data acquired by the portable telemetry monitor 98. The transmitter sub-circuit 102 in the portable telemetry monitor 98 then broadcasts the combined 8-bit address and physiological data signal back to the antenna array via the RF carrier signal 110. The signals at the various antennae 54 are then transmitted to the receiver subsystem 42 and from there, to the central station 14 for processing and subsequent display.

In the event that data communication is desired, i.e., that the clinician wishes to send information from the central station 14 to the portable telemetry monitor 98, the antenna transmitter circuit 66 switches into a communication mode. In this operational mode, a digital signal is encoded by the central station 14 and routed to all of the antennae 54 in the antenna array, where it is transmitted via the antenna transmitter 66 to the receiver sub-circuit 114 in the portable telemetry monitor 98. The information contained in this data can be either digital voice communication or system command data. The data is sent with a header address that is unique to each individual portable telemetry monitor 98. In this way, only the portable telemetry monitor 98 that is intended to receive the information will process and respond to the information.

Various features and advantages of the invention are set forth in the following claims.

What is claimed is:

1. A radio frequency patient monitoring system comprising:

a central station for analyzing and displaying physiological patient data;

a system receiver connected to the central station;

a plurality of antennas connected to the system receiver, each antenna operable to transmit a unique location code in a transmission range, wherein the transmission range of each antenna does not overlap; and a portable patient monitor including a transceiver, a microphone, and a speaker, the patent monitor operable to only receive the location code of the antenna associated with the transmission range in which the patient monitor is located, the patient monitor operable to acquire physiological patient data and to transmit the physiological patient data and the location code to the central station via the antenna associated with the transmission range in which the patient monitor is located, the patient monitor operable to receive voice data from and transmit voice data to the central station via the antenna associated with the transmission range in which the patient monitor is located, the central station being operable to process and convert the location code to a displayable form.

2. A patient monitoring system as set forth in claim 1 wherein each antenna includes a transmitter.

3. A patient monitoring system as set forth in claim 2 wherein each of the respective antennas includes a circuit board and wherein the respective transmitter is mounted on the circuit board.

4. A patient monitoring system as set forth in claim 3 wherein the respective antennas are discrete components from the respective transmitters.

5. A patient monitoring system comprising:
a central station operable to analyze and display physiological patient data;
a system receiver adapted to be connected to the central station;
a plurality of antennas adapted to be connected to the system receiver, each antenna being assigned a unique location code and being operable to transmit the unique location code within a transmission range, wherein the transmission range of each antenna is non-overlapping; and
a portable patient monitor operable to acquire the physiological patient data, the portable patient monitor including a transceiver operable to receive the unique location code when the portable patient monitor is within the transmission range and to combine the unique location code and the physiological patient data, and wherein the transceiver is operable to transmit the unique location code and the physiological patient data to the central station, wherein the central station is operable to process and convert the location code to a displayable form to determine the location of the patient.

6. A method of locating a portable patient monitor relative to an antenna array within a patient monitoring system, wherein the patient monitoring system includes a portable patient monitor operable to acquire physiological patient data and having a portable transmitter and receiver, a central station to analyze and display the physiological patient data and operable to be connected to the antenna array, the antenna array including a plurality of antennas and each antenna having connected thereto a respective antenna transmitter, the method comprising the acts of:
generating an address specific to each antenna, and each antenna having a transmission range, wherein each transmission range is non-overlapping;
each antenna transmitter transmitting its address using a low power carrier signal within its respective transmission range;
when the portable patient monitor is within one of the transmission ranges, the portable receiver receiving the address of the antenna associated with that transmission range;
the portable receiver combining the physiological patient data and the address into a second carrier signal;
the portable transmitter transmitting the second carrier signal back to the respective antenna for transmission to the central station; and
the central station processing and converting the second carrier signal to a displayable form to determine the location of the patient based on the address of the antenna.

7. A method as set forth in claim 6 wherein each antenna has a respective location, and wherein the method further comprises the act of programming the respective locations of the antenna into the central station.

8. A method as set forth in claim 6 and further comprising the act of transmitting data from the central station to the antenna array.

9. A method as set forth in claim 8 wherein the act of transmitting data from the central station to the antenna array includes the act of transmitting a header address unique to each portable patient monitor.

10. A method as set forth in claim 8 wherein the data is voice data.

11. A patient monitoring system comprising:
a plurality of antennas, each antenna including a receiver circuit and an antenna transmitter, each of the antennas assigned a unique address, each of the antenna transmitters operable to transmit its respective unique address in a transmission range, wherein each transmission range is non-overlapping;
a portable transmitter adapted to be connected to a patient and operable to acquire physiological data from the patient, the portable transmitter including a transceiver operable to receive the unique address and to transmit the physiological data and the unique address to the plurality of antennas;
a central station operable to generate an address header unique to the portable transmitter and encode a digital signal, the central station operable to combine the address header and the encoded digital signal and transmit the address header and the encoded signal to the plurality of antennas, wherein the plurality of antennas transmit the address header and the encoded signal to the portable transmitter identified by the address header.

12. A patient monitoring system as set forth in claim 11, and further comprising a system receiver connected to the central station, and wherein the system receiver transmits data from the antenna to the central station and transmits data from the central station to the antenna transmitter.

13. A patient monitoring system as set forth in claim 11 wherein the portable transmitter includes a microphone connected to the transmitter circuit to allow the transmission of voice data from the patient to the central station, and a speaker connected to the receiver circuit to allow the transmission of voice data from the central station to the patient.

14. A patient monitoring system as set forth in claim 11 wherein the antenna transmitter is operable to generate a location code unique to each of the antennas, and wherein the physiological data acquired by the portable transmitter is combined with the location code before being transmitted to the central station.

15. A patient monitoring system as set forth in claim 11 wherein each of the antennas includes a circuit board and wherein each of the antenna transmitters is mounted on the circuit board.

16. A patient monitoring system as set forth in claim 11 wherein the antenna is a discrete component from the antenna transmitter.

17. A method of locating a portable patient monitor relative to an antenna array, the method comprising:
storing antenna location information for a plurality of antennas in a central station, wherein each antenna location is unique;
each antenna transmitter transmitting its antenna location information in an antenna range, wherein each antenna range does not overlap;
the portable patient monitor receiving the antenna location information of the antenna associated with the antenna range in which the portable patient monitor is located;

the portable patient monitor acquiring physiological patient data;

the portable patient monitor combining the physiological patient data with the received antenna location information to generate a radio frequency signal;

the portable patient monitor transmitting the radio frequency signal to the central station via the plurality of antennas; and the central station processing and converting the radio frequency signal to a displayable form to determine the location of the portable patient monitor and to display the physiological patient data.

18. A method as set forth in claim 17 further comprising establishing communication with a patient connected to the portable patient monitor.

19. A method as set forth in claim 18 wherein establishing communication with a patient connected to the portable patient monitor, the method further comprises, each antenna transmitter switching to a communication mode, each antenna transmitter transmitting an encoded signal in its antenna range, and the portable patient monitor receiving the encoded signal and responding to the encoded signal.

20. A method as set forth in claim 19 wherein the encoded signal includes a header address that is unique to the portable patient monitor.

21. A patient monitoring system comprising:

means for acquiring physiological data from a patient;

means for analyzing and displaying the physiological patient data, the analyzing and displaying means storing a plurality of location codes;

means for receiving data, the receiving means adapted to be connected to the analyzing and displaying means;

first means for generating one of the location codes and transmitting the location code to a first predetermined range;

second means for generating one of the location codes different than the location code generated by the first means and transmitting the location code to a second predetermined range different than the first predetermined range, the acquiring means operable to only receive the location code associated with the predetermined range in which the acquiring means is located, the acquiring means operable to combine the physiological data and the received location code to generate a radio frequency signal, the acquiring means operable to transmit the radio frequency signal to the analyzing and displaying means, wherein the analyzing and displaying means is operable to receive and process the radio frequency signal to determine the location of the acquiring means.

22. A patient monitoring system as set forth in claim 21 wherein the acquiring means includes a first means for receiving the location code and a second means for transmitting the radio frequency signal.

23. A patient monitoring system as set forth in claim 22 wherein the second means for transmitting the radio frequency signal is operable to transmit the radio frequency signal to the receiving means.

24. A method of monitoring a patient, the method comprising:

acquiring physiological patient data from the patient with a patient monitor positioned on the patient;

periodically transmitting a plurality of unique location codes via radio frequency carrier signals, each code corresponding to a non-overlapping predefined area;

detecting the code when the patient is in the area corresponding to that code;

generating a second radio frequency carrier signal by combining the code with the physiological patient data;

periodically transmitting the second radio frequency carrier signal to a central station; and determining the location of the patient based on the code.

25. A method of communicating with a patient in a remote location, the method comprising:

positioning a patient monitor on the patient, the patient monitor including a speaker;

periodically transmitting a plurality of unique location codes via radio frequency carrier signals, each code corresponding to a non-overlapping predefined area;

encoding a digital signal with a header address that is unique to the patient monitor;

transmitting the encoded signal to all of the predefined areas; and the patient monitor identified by the header address, detecting and decoding the encoded signal to produce an audible signal through the speaker.

* * * * *